United States Patent [19]
Wursthorn et al.

[11] Patent Number: 4,731,403
[45] Date of Patent: Mar. 15, 1988

[54] LUBRICANTS FOR HALOGEN-CONTAINING THERMOPLASTIC RESINS AND COMPOSITIONS PREPARED THEREFROM

[75] Inventors: Karl R. Wursthorn, Cincinnati; Jeffrey R. Hyde, West Chester; Miller H. Goose, Jr., Cincinnati, all of Ohio

[73] Assignee: Morton Thiokol, Inc., Chicago, Ill.

[21] Appl. No.: 73,904

[22] Filed: Jul. 13, 1987

Related U.S. Application Data

[63] Continuation of Ser. No. 919,111, Oct. 15, 1986, abandoned.

[51] Int. Cl.$^4$ .......................... C08K 5/36; C08J 5/36; C08J 5/16
[52] U.S. Cl. .................................... 524/302; 524/186; 524/205; 524/225; 524/392; 524/393
[58] Field of Search ............... 524/186, 205, 225, 302, 524/392, 393

[56] References Cited

U.S. PATENT DOCUMENTS 3,305,580  2/1967  Homberg et al. ................... 524/302
4,336,168  6/1982  Hoch et al. .......................... 524/302

OTHER PUBLICATIONS

B. Smith & S. Hernestam, *Acta Chemica Scandinavica* (1954), pp. 1111–1119, vol. 8, No. 7.
Federal Registry, vol. 49, No. 4, p. 930, PMN, 84–284, Jan. 8, 1984.
Federal Registry, vol. 49, No. 156, p. 32112, PMN, 84–1034, Aug. 10, 1984.

*Primary Examiner*—Joseph L. Schofer
*Assistant Examiner*—Peter D. Mulcahy
*Attorney, Agent, or Firm*—Wayne E. Nacker; Gerald K. White

[57] ABSTRACT

Lubricants used in forming halogen-containing thermoplastic resin compositions are addition products of mercaptans and olefins and contain at least one free carboxyl group. Of particular interest are addition products of thio carboxylic acids and long chain alpha-olefins. These lubricants are used in amounts of from about 0.05 to about 5 parts per 100 parts of thermoplastic resin composition.

12 Claims, No Drawings

LUBRICANTS FOR HALOGEN-CONTAINING THERMOPLASTIC RESINS AND COMPOSITIONS PREPARED THEREFROM

This is a continuation of application Ser. No. 919,111, filed Oct. 15, 1986 and now abandoned.

The present invention relates to materials useful as processing lubricants for halogen-containing thermoplastic resins, such as polyvinyl chloride and polyvinylidene chloride, and to thermoplastic resin compositions containing such processing lubricants. In particular, the invention relates to the thermoplastic-lubricating use of compounds which can be described as addition products of an olefin and a mercaptan.

BACKGROUND OF THE INVENTION

In the processing of halogen-containing thermoplastic resins, such as polyvinyl chloride (PVC) and polyvinylidine chloride, to form moldable or extrudable formulations, it is customary to incorporate into the polymeric resin a variety of additives for special purposes to achieve desired processing properties as well as desired properties in the molded or extruded products. Often, the processing properties and properties of the product go hand-in-hand, for example, good rheological properties contribute to minimal resin degradation during mixing or extrusion and less color in the product composition. Among additives typically employed are lubricants, pigments, heat and light stabilizers, light-filtering materials, antioxidants and the like.

Lubricants are added to halogen-containing thermoplastic resin formulations for the purpose of improving rheological properties of the mixture, both before and after fusion. Lubricants are typically classified as external lubricants, which are insoluble in the resin and act to lubricate the interaction of separated resin products, and internal lubricants which are soluble in the resin. There is, however, not necessarily a sharp demarcation between internal lubricants and external lubricants, and lubricants, such as the lubricants described herein, may be partially soluble in the resin and serve both internal and external lubricating functions. Because the lubricants described in this invention are primarily used in substitution of conventional external lubricants, the lubricants according to the invention are referred to herein as "external lubricants". Typical external lubricants used in the industry are synthetic hydrocarbon paraffin waxes having melting points of about 160° F. (71° C.). To a lesser extent, low molecular weight mineral oils having low viscosities have been employed as external lubricants in conjunction with paraffin waxes.

In preparing fused compositions from mixtures that include halogen-containing thermoplastic resins, there exists continual problems of discoloration. Discoloration is typically caused by degradation of the resin itself, but may be caused in part by degradation of additives as well. The interaction of degradation products and additives also determines the course of color development in thermoplastic resins. A variety of materials, including the stabilizers and lubricants are available to inhibit color formation. The particular stabilizers and lubricants optimal for particular formulations and processing conditions generally must be empirically determined. Stabilizers are typically selected from organo-tin and organo-antimony compounds plus a variety of costabilizing compounds which enhance the stabilizing ability of the organo-tin and organo-antimony compounds, examples of such costabilizers being found in U.S. Pat. Nos. 4,360,619, 4,115,352, 3,647,748, 3,398,114, 3,507,827, 3,933,744, 4,269,731, 4,256,618, and 4,314,934.

There exists the need for novel lubricants for processing halogen-containing resins. Novel lubricants are expected to improve rheological conditions during processing of the formulation and thereby reduce degradation and color formation. As is the case with stabilizers, different specific lubricating compounds tend to be optimal for different particular thermoplastic formulations.

SUMMARY OF THE INVENTION

In accordance with the present invention, it is found that chemical compounds which can be described as the addition product of an olefin and a mercaptan, the —SH group of the mercaptan being added to the carbon-carbon double bond of the olefin, the compounds having at least one free carboxyl group, are useful as lubricants in formulations of halogen-containing resins. Although the actual method of synthesis of the lubricant compound is unimportant, a free-radical condensation between an olefin and a mercaptan provides a convenient method of forming lubricants. These compounds improve the rheological properties of the formulation both prior to and subsequent to fusion, resulting in less degradation of resin and minimal unwanted color development in the product composition. Preferably, the lubricating compound contains at least one carboxyl group or a salt thereof. Preferably, the lubricating compound has a relatively high molecular weight, e.g., about 400–800, and it is preferred that the lubricating compound be generally linear, as for example is achieved by free-radical addition of a mercaptan to a straight-chain alpha-olefin.

Formulations in accordance with the invention contain at least about 0.05 weight percent of the lubricant and generally contain at least about 0.15 weight percent of the lubricant.

DETAILED DESCRIPTION OF CERTAIN PREFERRED EMBODIMENTS

The present invention is directed to chemical compounds useful as lubricants employed in forming compositions of halogen-containing thermoplastic resins. The lubricants of the present invention can be described as addition products of a mercaptan and an olefin, wherein the mercaptan moiety adds at the carbon-carbon double bond site of the olefin; the lubricant compounds also have at least one free carboxyl group, provided by either the olefin or the mercaptan. Although the invention does not require that the lubricants be formed by such an addition reaction, the lubricants are frequently formed by free radical addition of commonly available mercaptans and commonly available olefins.

Although the lubricants described herein have some solubility in halogen-containing thermoplastics and therefore are not strictly external lubricants, these lubricants are used in place of conventional external lubricants, such as a paraffin wax, and are referred to herein as external lubricants.

The synthetic lubricants for thermoplastic polymer processing function as highly efficient metal release agents, as melt viscosity reductants, and as polymer heat stability improvers. This combination of processing properties is wholly unexpected.

The lubricating compounds of this invention have quite unexpectedly been found to impart processing properties to halogen-containing organic polymers which are superior to those of lubricating compositions previously known in the art.

The term "halogen-containing thermoplastic resin" as used herein refers to halogen-containing vinyl and vinylidene polymers or resins in which the halogen is attached directly to the carbon atoms. Preferably, the polymer is a vinyl halide polymer, more particularly, a vinyl chloride polymer. Usually, the vinyl chloride polymer is made from monomers consisting of vinyl chloride alone or a mixture of monomers comprising, preferably, at least about 70% by weight, based on the total monomer weight, of vinyl chloride. The term "halogen-containing thermoplastic resins" also includes polymer resins that are halogenated subsequent to their polymerization.

The halogen-containing thermoplastic resins which can be lubricated according to this invention include chlorinated polyethylene having 14 to 75%, e.g., 27%, chloride by weight, chlorinated polystyrene, chlorinated polyvinyl chloride, polyvinyl bromide, polyvinyl fluoride, copolymers of vinyl chloride with 1 to 90%, preferably 1 to 30%, of a copolymerizable ethylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methylacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloracrylonitrile, allyl dene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride-2-ethylhexyl acrylate (80:20). In addition to the stabilizer compositions of this invention, there can be incorporated into the halogen-containing thermoplastic resin conventional additives such as plasticizers, pigments, fillers, dyes, ultraviolet light-absorbing agents, densifying agents and the like.

Addition of mercaptans to olefins affords a simple yet highly effective means of chemically modifying a hydrocarbon structure. Olefins useful to this invention include, but are not limited to, the following structure:

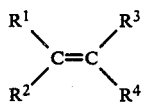
I.

wherein $R^1$, $R^2$, $R^3$, and $R^4$ can be the same or different and are selected from H, alkyl, aryl, alkenyl, aralkyl, cycloalkyl, and cycloalkenyl, or alkyl, aryl, alkenyl, aralkyl, cycloalkyl, and cycloalkenyl substituted from one or more groups selected from $-S-R^{50}$, $-O-R^{50}$,

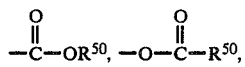

—CN, —NO$_2$, —Cl, —Br, —I,

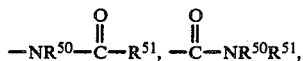

—NR$^{50}$R$^{51}$, wherein R$^{50}$ and R$^{51}$ are selected from H, alkyl, aryl, alkenyl, aralkyl, cycloalkyl, and cycloalkenyl.

Examples of olefins and mixtures of olefins represented by Formula I are listed below.

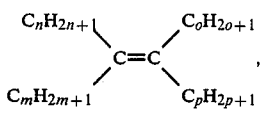

where m=0-48, n=0-48, o=0-48, p=0-48 with the proviso that n+m+o+p+2=8 to 50. Preferably m+n+o+p+2=30 to 50. Preferably, two, and more preferably three, of n, m, o and p=0.

Specific examples of commercially available alpha-olefins depicted by the above formula include: GULF-TENE alpha-olefins with carbon numbers $C_8$, $C_{10}$, $C_{12}$, $C_{14}$, $C_{16}$, $C_{18}$, $C_{20-24}$, $C_{24-28}$, and $C_{30+}$; Chevron Chemical's alpha-olefins with carbon numbers $C_{8-10}$, $C_{10}$, $C_{11-14}$, $C_{11-12}$, $C_{13-14}$, $C_{15-20}$, $C_{15-18}$, $C_{13-20}$, $C_{18-20}$; and Shell Chemical Company's alpha-olefins NEODENE 16, NEODENE 18 and NEODENE 20.

Other examples of olefins include but are not limited to the following:

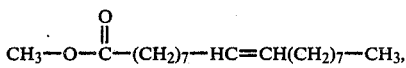

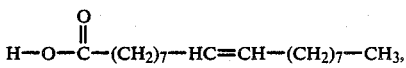

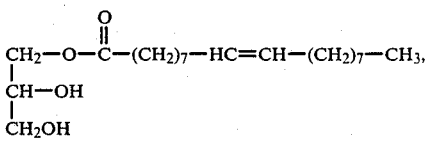

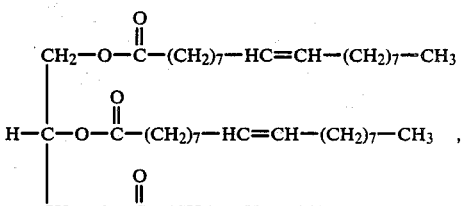

C$_6$H$_5$—HC=CH$_2$, and (C$_6$H$_{11}$)—HC=CH$_2$.

Mercaptans useful to this invention include but are not limited to the following structures:

H—S—R$^5$,                II.

wherein R$^5$ is defined as above for R$^1$-R$^4$;

HS—R⁶—SH                III.

wherein R⁶ is alkylene, arylene, alkenylene, cycloalkene, cycloalkenylene, —R⁷—(O—R⁸)$_n$—, $$-R^7-O-\overset{\overset{O}{\|}}{C}-R^8-$$

wherein R⁷ and R⁸ are the same or different and are are alkylene, arylene, alkenylene, cycloalkene or cycloalkenylene and n=1 to 10 where R⁸ can vary from one repeat unit to the next, $$(HS-R^7-\overset{\overset{O}{\|}}{C}-O-CH_2)_qCR^1{}_{4-q}$$   IV.

where q=1 to 4; and

H—S—X—R⁵                V.

wherein X=

$$-\overset{\overset{O}{\|}}{C}-, -\overset{\overset{S}{\|}}{C}-.$$

Examples of mercaptans represented by Formula II are:

H—S—H,

HS—C₁₂H₂₅, $$HS-CH_2-CH_2-\overset{\overset{O}{\|}}{C}-OH,$$

$$HS-CH_2-\overset{\overset{O}{\|}}{C}-OH,$$

$$HS-CH_2-\overset{\overset{O}{\|}}{C}-O-C_8H_{17}, \text{ and}$$

$$HS-CH_2-CH_2-O-\overset{\overset{O}{\|}}{C}-C_{17}H_{35}.$$

Examples of mercaptans represented by Formula III are:

HS—CH₂—CH₂—O—CH₂—CH₂—SH,

HS—CH₂—CH₂—O—CH₂—O—CH₂—CH₂—SH, and

HS—CH₂—CH₂—CH₂—SH.

Examples of mercaptans represented by Formula IV are:

$$(HS-CH_2-CH_2-\overset{\overset{O}{\|}}{C}-O-CH_2)_4-C,$$

$$(HS-CH_2-\overset{\overset{O}{\|}}{C}-O-CH_2)_4-C, \text{ and}$$

$$(HS-CH_2-\overset{\overset{O}{\|}}{C}-O-CH_2)_3-C-CH_3$$

Examples of mercaptans represented by Formula V are:

$$HS-\overset{\overset{O}{\|}}{C}-CH_3 \text{ and}$$

$$HS-\overset{\overset{O}{\|}}{C}-C_{11}H_{23}.$$

Lubricant compounds according to the invention have at least one free carboxyl moiety and may have an acid number up to about 100. Of particular interest are olefin/mercaptan addition products having the general formula:

$$(C_m)(C_n)HC-C(C_o)(C_p)(S-C_q-\overset{\overset{O}{\|}}{C}-OH),$$   VI.

wherein $C_m$, $C_n$, $C_o$, $C_p$, and $C_q$ are straight or branched, saturated or unsaturated carbon chains with the number of carbons designated by the subscripted letter. High molecular weight compounds are preferred, and it is preferred that m+n+o+p+q be greater than or equal to 29. Preferably q=1 to 3, and m+n+o+p is equal to or greater than 28. More preferably q=1 to 3, n is equal to or greater than 28 and m, o and p are each equal to 0. That is to say, for lubricating purposes, it is preferred that the lubricant be an addition product of a long chain olefin, more preferably an alpha-olefin, with a short chain mercapto carboxylic acid. For lubricating purposes, a high degree of linearity of the molecule is preferred; thus, it is preferred that the olefin precursor be a straight or substantially straight-chain alpha-olefin. The lubricant molecule represented by formula VI may have some degree of unsaturation, although such unsaturation will affect the lubricating properties of the molecule. However, because the lubricating molecule is commonly formed as an olefin/mercapto carboxylic acid addition product, additional unsaturation in the olefin would result in addition of additional mercapto carboxylic acid moieties, and generally there would be no particular reason for subsequently introducing unsaturation in the lubrication molecule.

In selecting lubricant molecule precursors, cost is an important consideration. Long chain alpha-olefins, such as C₃₀₊ alpha-olefins are commercially available and relatively inexpensive. Likewise short-chain mercapto carboxylic acids are commercially available and relatively inexpensive. Particularly suitable mercapto carboxylic acids include thioglycolic acid, beta-mercaptopropionic acid and thiolactic acid.

It is to be appreciated that lubricants having generally similar lubricating properties may be formed by addition of a short-chain olefin with a long-chain mercapto carboxylic acid; however, suitable long-chain mercapto carboxylic acid precursors are not generally available and the use of such would add substantially to the cost of the lubricant and to thermoplastic formulations. It is inherent from the foregoing discussion that the lubricants may comprise a mixture of lubricating molecules, e.g., lubricant molecules formed from a mixture of long-chain alpha-olefins.

The invention also includes the use of salts of lubricating molecules having free carboxyl groups, particularly alkaline carthmetal salts. Particularly important are calcium salts in which two lubricating molecules having free carboxyl groups are jointly bound to a calcium cation.

In lubricants formed by addition of an olefin and a mercapto carboxylic acid, up to about 50 percent of the lubricant may be unreacted olefin and mercapto carboxylic acid, balance reacted addition product. The precursors, particularly the long-chain olefins, have some inherent lubricating properties.

Procedures for adding mercaptans to olefins are well known to those skilled in the art. U.S. Pat. No. 2,587,616 and German Federal Republic Pat. No. 740,247 are but two examples of methods which may be used to prepare compounds such as those encompassed by this invention.

A typical reaction is presented below in which a free radical-initiated addition

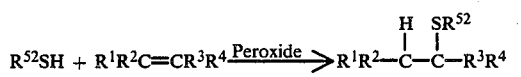

of a mercaptan to an olefin is depicted. Under free radical conditions, addition is anti-Markovnikov. However, reactions may proceed slowly under non-free radical conditions to give the Markovnikov addition product. Lubricants according to the invention involve both Markovnikov and non-Markovnikov addition products.

Examples of sulfides obtained by this route include but are not limited to the following:

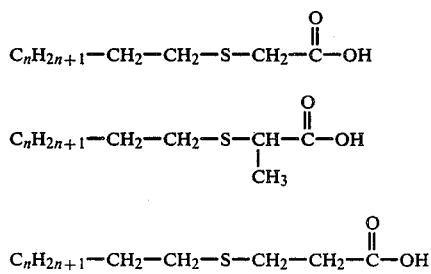

where n=28–48.

Lubricants in accordance with this invention are added to thermoplastic resin formulations at between about 0.05 and about 5 parts and preferably between about 0.05 and about 0.25 parts per 100 parts of thermoplastic resin. Additives to the thermplastic resin, include the external lubricants, internal lubricants, color-imparting agents, such as titanium dioxide, light-absorbing agents, stabilizers, etc. The total parts of additives per 100 parts of resin total less than about 20 parts and preferably less than about 10 parts.

The lubricants in accordance with the present invention are solids at room temperature and may be blended in a dry mix with resin particulates and other particulate additives. The dry mix is heated, e.g., by high-shear mechanical mixing, to fuse the resin formulation. The fused formulation may be formed into product, e.g., by casting, injection molding, extrusion, etc. In the case of extrusion, it may be desirable to include unreacted long-chain olefin along with an alkaline earth metal salt, such as calcium stearate, for control of fusion time.

Brabender torque rheometry is used to evaluate lubricant efficiency. Data obtained on torque-time curves are fusion time as indicated by the time to maximum torque after loading, the maximum torque value at fusion, the minimum torque value after fusion, and the torque response after the minimum torque value.

To those skilled in the art, Brabender torque rheometry data can be related to lubricant efficiency. For example, if the part level of all ingredients in a formulation are held constant and only the composition of the external lubricant is changed, then an increase in fusion time and a decrease in the maximum torque is interpreted as an overall increase in external lubricity; a decrease in minimum torque after fusion is interpreted as a decrease in melt viscosity; and no change in torque with time after minimum torque is interpreted as good polymer melt-metal release and as an increase in stability relative to torque-time curves that increase in torque after the minimum is obtained. The latter observation is further confirmed by noting that less sticking of the polymer melt to the melt surfaces occurs when the torque response after minimum torque is constant compared to when it increases after the minimum torque. Furthermore, timed samples withdrawn from the mixing bowl show less degradation, as indicated by less total color change from white, when the torque response after minimum torque is constant compared to when it is increasing. Total color change is measured with a Hunter Colorimeter using L values. L equal to 100 equals white and L equal to zero equals black.

The invention is further illustrated by the examples which follow. These examples represent certain preferred embodiments of the invention and are not to be construed in limitation thereof.

EXAMPLE 1

To 100 gm of a mixture at 70° C. of (1) GULFTENE $C_{30+}$ alpha-olefins having an average carbon number of 30 were added 5.92 gm of (2) thioglycolic acid and 0.5 gm dibenzoylperoxide. The reaction mixture then was heated to 100° C. and held for two hours. After this heating period, iodine titratrion for free mercaptan showed greater than 96% reaction. The product mixture (3) was poured out, cooled, and analyzed. An acid number of 30.02 was found. Reaction of the olefin with the thioglycolic acid was further confirmed by infrared spectroscopy and proton and carbon-13 nuclear magnetic spectroscopy.

EXAMPLES 2–4

Compound and test procedure use in Examples 2–4 are as follows:

Mixtures were prepared by dry blending to 110° C. in a Henschell high-intensity mixer (Model 2JSS) 100.0 parts polyvinyl chloride (GEON 103EP-F76 available commercially from B. F. Goodrich Chemical Company) with 3.0 parts of fine particle size calcium carbonate coated with stearic acid, 1.0 part titanium dioxide, 0.60 part calcium stearate, 0.040 ADVASTAB TM-692, and 1.2 part of the lubricants listed in the accompanying tables.

Each blend was cooled to room temperature before testing. Evaluation was performed by charging via a loading chute 66 gm of compound to a number 6 oil-heated mixing head fitted to a Brabender torque rheometer. Test conditions are 190° C. and 60 RPM drive speed.

EXAMPLE 2

The following illustrates the unique properties of the thioglycolic acid/alpha-olefin adduct (3) derived from Example 1. This example further illustrates that simple admixtures of thioglycolic acid (2) and alpha-olefin (1) do not give the same properties. Ratios of alpha-olefin (1) and thioglycolic acid (2) were selected such that the acid number of their mixture equaled that of the alpha-olefin (1) and the adduct (3). These materials were then compounded and their performance evaluated on a Brabender torque rheometer. The results are presented in Table I.

TABLE I

| Compd EXP No. | Part A 1 | 2 | 3 | Acid No.[a] | Performance Parameter[b] FTR | MTR | ETR | SR | LR |
|---|---|---|---|---|---|---|---|---|---|
| 1. | 1.20 | 0.00 | 0.00 | 0 | 1.00 | 1.00 | 1.00 | 1.00 | 1.00 |
| 2. | 1.1856 | 0.0145 | 0.00 | 7.5 | 1.00 | 1.04 | 1.13 | 1.13 | 0.92 |
| 3. | 0.9 | 0.00 | 0.30 | 7.5 | 1.13 | 1.02 | 0.85 | 0.00 | 1.29 |
| 4. | 1.171 | 0.0295 | 0.00 | 15 | 1.20 | 0.98 | 1.16 | 1.13 | 0.94 |
| 5. | 0.60 | 0.00 | 0.60 | 15 | 1.40 | 0.95 | 0.89 | 0.00 | 1.47 |

[a]Acid number of the lubricant mix
[b]Performance parameters are expressed as ratios relative to EXP No. 1. FTR, MTR, ETR, SR and LR are fusion time ratio, maximum torque ratio, equilibrium torque ratio, slope after minimum torque ratio, and Hunter L value of 10 minute samples, respectively.

EXAMPLE 3

The following example compares the lubricating properties of the parent alpha-olefin (1) with its beta-mercaptopropionic acid adduct (4) and combinations of (1) and (4) wherein the total part level of external lubricant is held constant. The adduct was formed by reacting at 100° C. 100 gm of alpha-olefin (1) with 7.98 gm beta-mercaptopropionic acid and 0.5 gm dibenzoyl-peroxide to give a product with a 40 acid number. This adduct reduces SR values to zero and improves stability while all other values remain essentially unchanged.

TABLE II

| Compound No. | Part Level 1 | 4 | Performance Parameters[c] FTR | MTR | ETR | SR | LR Exp. |
|---|---|---|---|---|---|---|---|
| 1. | 1.20 | 0.00 | 1.0 | 1.0 | 1.0 | 1.0 | 1.0 |
| 2. | 0.60 | 0.60 | 0.93 | 1.07 | 1.0 | 0.25 | 1.07 |
| 3. | 0.0 | 1.20 | 0.93 | 1.07 | 1.07 | 0.00 | 1.08 |

[c]Performance parameters as defined in Table I (note [b]).

EXAMPLE 4

The following example compares the lubricating properties of the parent alpha-olefin (1) with its thiolactic acid adduct (5) and combinations of (1) and (5) wherein the total lubricant part level of external lubricant is held constant. A product of acid number 30 was formed by reacting 100 gm of alpha-olefin (1) with 5.82 gm of thiolactic acid and 0.5 gm of dibenzoylperoxide. As in Example 4, the most notable effect was the change is SR values from 1.0 to zero and improvement in stability as indicated by increased LR values.

TABLE III

| Compound EXP. No. | Part Level 1 | 5 | Performance Parameters[d] FTR | MTR | ETR | SR | LR |
|---|---|---|---|---|---|---|---|
| 1. | 1.2 | 0.0 | 1.0 | 1.0 | 1.0 | 1.0 | 1.0 |
| 2. | 0.6 | 0.6 | 1.07 | 1.068 | 1.0 | 0.0 | 1.08 |

TABLE III-continued

| Compound EXP. No. | Part Level 1 | 5 | Performance Parameters[d] FTR | MTR | ETR | SR | LR |
|---|---|---|---|---|---|---|---|
| 3. | 0.0 | 1.2 | 1.14 | 1.068 | 1.0 | 0.0 | 1.07 |

[d]Performance Parameters as defined in Table I (note [b]).

While the invention has been described in terms of certain preferred embodiments, modifications obvious to one with ordinary skill in the art may be made without departing from the scope of the present invention.

Various features of the invention are set forth in the following claims.

What is claimed:

1. A thermoplastic resin composition comprising a halogen-containing thermoplastic resin and a lubricant compound which is an addition product of (1) an olefin and (2) a mercaptan, the —SH group of said mercaptan joining to a carbon-carbon double bond of said olefin, attaching the H of said —SH group to one of the double-bonded carbons and attaching the S of said —SH group to the other of the double-bonded carbons, the carbons to which said S is attached in said lubricant compound being saturated, said lubricant compound having at least one free carboxyl group or salt of a free carboxyl group, said lubricant compound being present at between about 0.05 and about 5 parts by weight per 100 parts of said resin.

2. A resin composition according to claim 1 wherein said lubricant is an addition product of (1) an olefin having the formula:

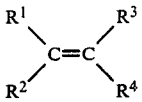

wherein $R^1$, $R^2$, $R^3$, and $R^4$ can be the same or different and are selected from H, alkyl, aryl, alkenyl, aralkyl, cycloalkyl, and cycloalkenyl, or alkyl, aryl, alkenyl, aralkyl, cycloalkyl, and cycloalkenyl substituted from one or more groups selected from —S—$R^{50}$, —O—$R^{50}$,

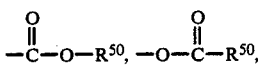

—CN, —NO$_2$, —Cl, —Br, —I,

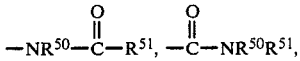

—NR$^{50}$R$^{51}$, wherein R$^{50}$ and R$^{51}$ are selected from H, alkyl, aryl, alkenyl, aralkyl, cycloalkyl, and cycloalkenyl;

and (2) a mercaptan having a formula selected from the group consisting of:

H—S—R$^5$ wherein R$^5$ is defined as above for R$^1$–R$^4$;

HS—R$^6$—SH wherein R$^6$ is alkylene, arylene, alkenylene, cycloalkene, cycloalkenylene, —R$^7$—(O—R$^8$)$_n$—, $$-R^7-O-\overset{O}{\underset{\|}{C}}-R^8-$$

wherein R$^7$ and R$^8$ are the same or different and are are alkylene, arylene, alkenylene, cycloalkene or cycloalkenylene and n=1 to 10 where R$^8$ can vary from one repeat unit to the next;

$$(HS-R^7-\overset{O}{\underset{\|}{C}}-O-CH_2)_q CR^1{}_{4-q}$$

where q=1 to 4; and

H—S—X—R$^5$ wherein X=

$$-\overset{O}{\underset{\|}{C}}-\text{ or } -\overset{S}{\underset{\|}{C}}-.$$

3. A resin composition according to claim 2 wherein said olefin is selected from the group consisting of $$\begin{array}{c}C_nH_{2n+1}\\C_mH_{2m+1}\end{array}\!\!\!\!\!C\!\!=\!\!C\!\!\!\!\!\begin{array}{c}C_oH_{2o+1}\\C_pH_{2p+1}\end{array}$$

where m=0–48, n=0–48, o=0–48, p=0–48 with the provisio that n+m+o+p+2=8 to 50;

$$CH_3-O-\overset{O}{\underset{\|}{C}}-(CH_2)_7-HC\!=\!CH(CH_2)_7-CH_3;$$

$$H-O-\overset{O}{\underset{\|}{C}}-(CH_2)_7-HC\!=\!CH-(CH_2)_7-CH_3;$$

$$\begin{array}{l}CH_2-O-\overset{O}{\underset{\|}{C}}-(CH_2)_7-HC\!=\!CH-(CH_2)_7-CH_3;\\|\\CH-OH\\|\\CH_2OH\end{array}$$

-continued $$\begin{array}{l}CH_2-O-\overset{O}{\underset{\|}{C}}-(CH_2)_7-HC\!=\!CH-(CH_2)_7-CH_3\\|\\H-C-O-\overset{O}{\underset{\|}{C}}-(CH_2)_7-HC\!=\!CH-(CH_2)_7-CH_3\ ;\\|\\CH_2-O-\overset{O}{\underset{\|}{C}}-(CH_2)_7-HC\!=\!CH-(CH_2)_7-CH_3\end{array}$$

C$_6$H$_5$—HC=CH$_2$; and (C$_6$H$_{11}$)—HC=CH$_2$.

4. A resin composition according to claim 2 wherein said mercaptan is selected from the group consisting of

H—S—H;

HS—C$_{12}$H$_{25}$;

$$HS-CH_2-CH_2-\overset{O}{\underset{\|}{C}}-OH;$$

$$HS-CH_2-\overset{O}{\underset{\|}{C}}-OH;$$

$$HS-CH_2-\overset{O}{\underset{\|}{C}}-O-C_8H_{17};$$

$$HS-CH_2-CH_2-O-\overset{O}{\underset{\|}{C}}-C_{17}H_{35};$$

HS—CH$_2$—CH$_2$—O—CH$_2$—CH$_2$—SH;

HS—CH$_2$—CH$_2$—O—CH$_2$—O—CH$_2$—CH$_2$—SH;

HS—CH$_2$—CH$_2$—CH$_2$—SH;

$$(HS-CH_2-CH_2-\overset{O}{\underset{\|}{C}}-O-CH_2)_4-C;$$

$$(HS-CH_2-\overset{O}{\underset{\|}{C}}-O-CH_2)_4-C;$$

$$(HS-CH_2-\overset{O}{\underset{\|}{C}}-O-CH_2)_3-C-CH_3;$$

$$HS-\overset{O}{\underset{\|}{C}}-CH_3; \text{ and}$$

$$HS-\overset{O}{\underset{\|}{C}}-C_{11}H_{23}.$$

5. A thermoplastic resin composition comprising a halogen-containing thermoplastic resin and a lubricant compound having the formula:

$$(C_m)(C_n)HC-C-(C_o)(C_p)(S-C_q-\overset{O}{\underset{\|}{C}}-OH),$$

wherein C$_m$, C$_n$, C$_o$, C$_p$, and C$_q$ are straight or branched, saturated or unsaturated carbon chains with the number of carbons designated by the subscripted letter or hydrogen wherein the subscripted letter equals 0, and m+n+o+p+q are greater than or equal to 29, said S being attached to saturated carbons, said lubricant compound being present at between about 0.05 and about 5 parts by weight per 100 parts of said resin.

6. A composition according to claim 5 wherein q=1 to 3.

7. A composition according to claim 5 wherein n is equal to or greater than 28 and m, o and p are each equal to 0.

8. A composition according to claim 1 wherein said lubricant compound has a calcium salt of a free carboxyl group.

9. A method of preparing a resin composition comprising blending particulates of a halogen-containing thermoplastic resin with a lubricant compound which is an addition product of (1) an olefin and (2) a mercaptan, and which contains at least one free carboxyl group or a salt of a free carboxyl group, the —SH group of said mercaptan joining to a carbon-carbon double bond of said olefin, attaching the H of said —SH group to one of the double-bonded carbons and attaching the S of said —SH group to the other of the double-bonded carbons, the carbons to which said S is attached in said lubricant compound being saturated, said lubricant compound being provided at about 0.05 to about 5 parts per 100 parts by weight of said resin, heating said blend to fuse the same and forming said fused composition.

10. A method according to claim 9 wherein said lubricant is the addition product or equivalent of (1) an olefin having the formula:

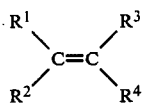

wherein $R^1$, $R^2$, $R^3$, and $R^4$ can be the same or different and are selected from H, alkyl, aryl, alkenyl, aralkyl, cycloalkyl, and cycloalkenyl, or alkyl, aryl, alkenyl, aralkyl, cycloalkyl, and cycloalkenyl substituted from one or more groups selected from —S—$R^{50}$, —O—$R^{50}$,

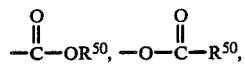

—CN, —$NO_2$, —Cl, —Br, —I,

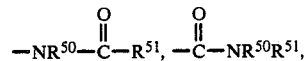

—$NR^{50}R^{51}$, wherein $R^{50}$ and $R^{51}$ are selected from H, alkyl, aryl, alkenyl, aralkyl, cycloalkyl, and cycloalkenyl and (2) a mercaptan having a formula selected from the group consisting of:

H—S—$R^5$, wherein $R^5$ is defined as above for $R^1$-$R^4$;

HS—$R^6$—SH, wherein $R^6$ is alkylene, arylene, alkenylene, cycloalkene, cycloalkenylene, —$R^7$—(O—$R^8$)$_n$—,

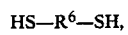

wherein $R^7$ and $R^8$ are the same or different and are are alkylene, arylene, alkenylene, cycloalkene or cycloalkenylene and n=1 to 10 where $R^8$ can vary from one repeat unit to the next; and

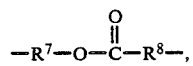

where q=1 to 4.

11. A method of preparing a resin composition comprising blending particulates of a halogen-containing thermoplastic resin with a lubricant compound having the formula:

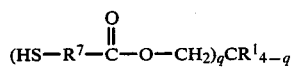

wherein $C_m$, $C_n$, $C_o$, $C_p$, and $C_q$ are straight or branched, saturated or unsaturated carbon chains with the number of carbons designated by the subscripted letter or hydrogen wherein the subscripted letter equals 0, and m+n+o+p are greater than or equal to 29, said S being attached to saturated carbons, said lubricant compound being provided at about 0.05 to about 5 parts per 100 parts by weight of said resin, heating said blend to fuse the same and forming said fused composition.

12. A method according to claim 9 wherein said lubricant compound has a calcium salt of a free carboxyl group.

* * * * *